US009504004B1

(12) United States Patent
Auvenshine et al.

(10) Patent No.: US 9,504,004 B1
(45) Date of Patent: *Nov. 22, 2016

(54) METHOD FOR DEVICE TO REPORT WHEN IT MAY BE MISSING

(71) Applicant: INTERNATIONAL BUSINESS MACHINES CORPORATION, Armonk, NY (US)

(72) Inventors: John J. Auvenshine, Tucson, AZ (US); Henry C. Will, IV, Englewood Cliffs, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/177,787

(22) Filed: Jun. 9, 2016

Related U.S. Application Data

(63) Continuation-in-part of application No. 14/997,192, filed on Jan. 15, 2016.

(51) Int. Cl.
*H04W 24/00* (2009.01)
*H04W 64/00* (2009.01)
*H04W 4/02* (2009.01)
*H04W 68/00* (2009.01)

(52) U.S. Cl.
CPC ............ *H04W 64/00* (2013.01); *H04W 4/028* (2013.01); *H04W 68/005* (2013.01)

(58) Field of Classification Search
CPC ..... H04W 4/02; H04W 12/12; H04W 4/028; G08B 21/24; G08B 21/182; G06Q 10/087; G06Q 7/0008; G06K 7/0008
USPC ............ 455/456.3, 410; 340/539.32, 539.11, 340/572.1; 235/385
See application file for complete search history.

(56) References Cited

U.S. PATENT DOCUMENTS

| 8,810,392 B1* | 8/2014 | Teller ..................... G08B 21/24 235/385 |
| 2014/0179270 A1 | 6/2014 | Anand |
| 2015/0179046 A1* | 6/2015 | Stevens ................. G08B 21/24 455/456.1 |

* cited by examiner

*Primary Examiner* — Olumide T Ajibade Akonai
*Assistant Examiner* — Alexander Yi
(74) *Attorney, Agent, or Firm* — Shimokaji IP

(57) ABSTRACT

A method of locating a smartphone or electronic device may include determining a location of a such device (e.g. smartphone), continuously monitoring time and location of the smartphone, predicting expected locations of the smartphone, and issuing alerts regarding the location of the smartphone.

1 Claim, 1 Drawing Sheet

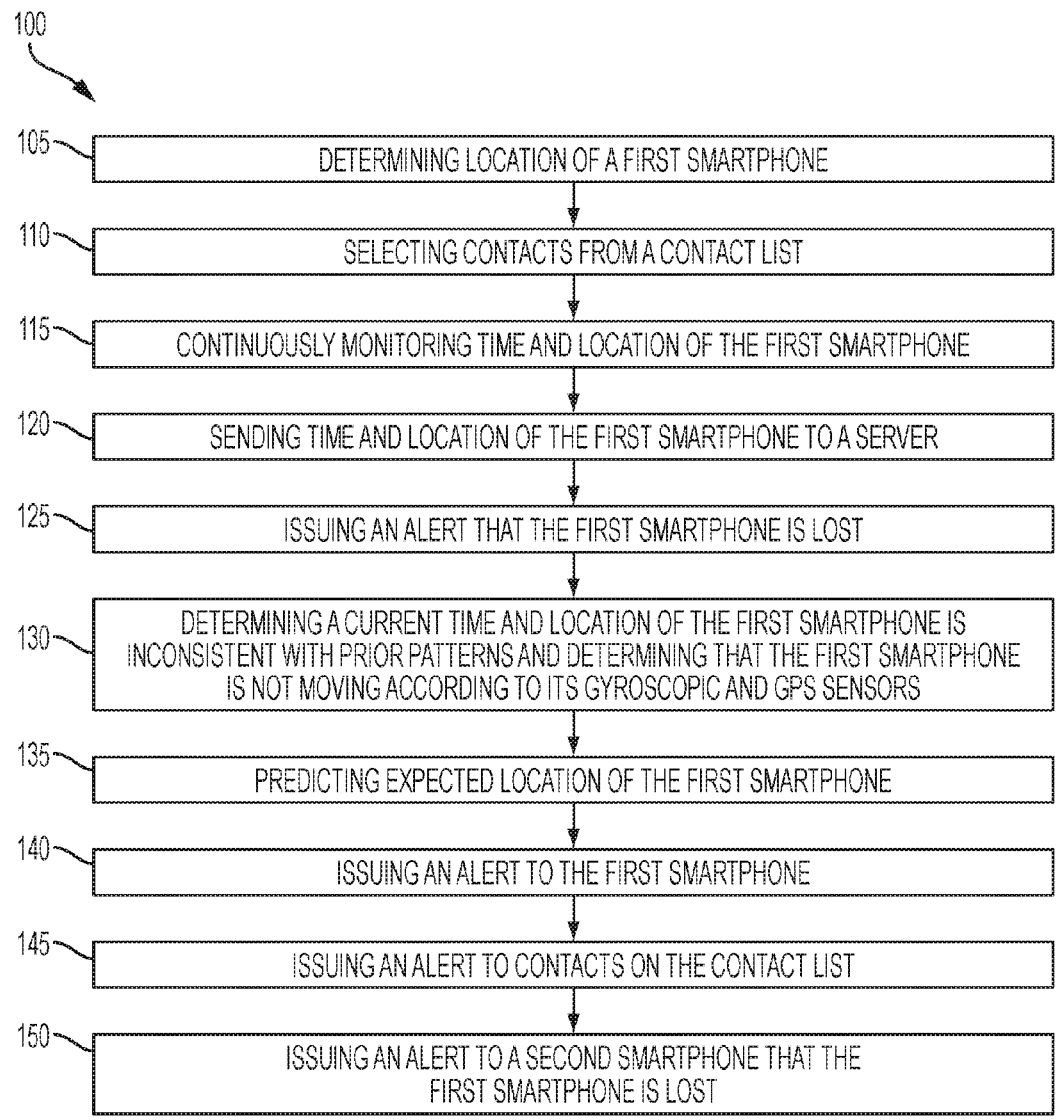

METHOD FOR DEVICE TO REPORT WHEN IT MAY BE MISSING

This application is a continuation in part of parent application Ser. No. 14/997,192, and claims priority benefit to that application.

BACKGROUND OF THE INVENTION

The present invention generally relates to a method of determining the location of a smartphone or other electronic device. More particularly, the present invention relates to locating a smartphone and issuing alerts. This invention may also be applied to other mobile devices or any electronic device capable of determining its location and communicating with other electronic devices to report its status.

A person might not realize a device is missing until after a battery runs out or the person is a long way from the device.

As can be seen, there is a need for a method for locating a smartphone and issuing alerts.

SUMMARY OF THE INVENTION

In one aspect, a computer program product may comprise a computer readable storage medium having program instructions embodied therewith, the program instructions by a computer may cause the device to determine that a first electronic device is not within its expected location, the expected location predicted based on previous movement patterns of the first electronic device captured via location data such as GPS and time associated with the previous movement patterns; select contacts from a contact list on the first electronic device for notification of the contacts when the first electronic device is not within its expected location; continuously monitor time and location data for the first electronic device; sending the time and location data of the first electronic device to a centralized server, wherein the location data of the first electronic device is reported as location coordinates; issue an alert that the first electronic device is lost, wherein the alert that the first electronic device is lost is based on determining that a current time and location of the first electronic device is inconsistent with prior patterns, and based on determining that the first electronic device is not moving according to its acceleration, gyroscopic and GPS sensors, and based on the electronic device following a set pattern, and based on analytics performed at the centralized server in conjunction with time and location data from other registered devices indicating that the first electronic device is not near other electronic devices it is normally near at this time or location, wherein the expected location is further predicted as a function of a distance between the first electronic device and a nearby second electronic device having the first electronic device's previous movement patterns and known to be traveling with the first electronic device, wherein the alerting issues a first alert call to the first electronic device if there has been no use of the first electronic device since a current normal location of the first electronic device changed, wherein the alerting issues a second alert call to the contacts on the contact list of whom first electronic device user is normally with at this time if there is no response from the first alert call, wherein the alerting further includes issuing a third alert to the second electronic device that the first electronic device is lost, wherein the expected location is predicted as a function of location in relation to other devices that are located nearby or are known to be traveling with the first electronic device, wherein the first electronic device tracks it's distance to the second electronic device using electronic signal strength between the devices, and wherein when the electronic signal strength is determined to go below a threshold, the first electronic device emits a notification and the second electronic device emits a notification.

These and other features, aspects and advantages of the present invention will become better understood with reference to the following drawings, description and claims.

BRIEF DESCRIPTION OF THE DRAWINGS

FIG. 1 illustrates a method of locating a smartphone and issuing alerts.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a method of locating a smartphone and issuing alerts.

Where the term "first electronic device" is used, it may refer to any network connected to an electronic device including network connected media players, watches, phones such as smartphones, GPS, tablets, notebook or laptop computers. The term "second electronic device" may encompass all of the devices of the term "first electronic device", and in addition may also include vehicle mounted information, navigation, security, emergency alert/response, or entertainment systems, as well as wired telephones, security systems, desktop computers, and other electronic devices which typically remain in a fixed location.

In FIG. 1, a method 100 may include a step 105 of determining location of a first smartphone. A step 110 may include selecting contacts from a contact list. A step 115 may include continuously monitoring time and location of the first smartphone. A step 120 may include sending time and location of the first smartphone to a server. A step 125 may include issuing an alert that the first smartphone is lost. A step 130 may include determining that a current time and location of the first smartphone is inconsistent with prior patterns and determining that the first smartphone is not moving according to its gyroscopic and GPS location. A step 135 may include predicting an expected location of a smartphone. A step 140 may include issuing an alert to the first smartphone. A step 145 may include issuing an alert to contacts on the contact list. A step 150 may include issuing an alert to a second smartphone that the first smartphone is lost.

In an embodiment, the method 100 may determine when a device such as a smartphone is not in its usual location. The method 100 may determine when a device is not with other devices that it is usually with or has been with recently. The method 100 may determine whether the device is likely to be near an owner of the device if there is not a response from the owner of the device.

In an embodiment, the method 100 may include tracking a person's use of a device, location of the device at certain points of the day and location of the family and friends (including associates) of those who are usually near the person. By tracking the location of the device, the status of operation (when it is set to vibrate or silent), location of people (family and friends) and the patterns of these in relation to time and days, as well as calendar events (such as birthday parties, meetings, etc.), analytics will be able to tell when the device owner may have accidentally left the device somewhere. At this point, the method 100 can send a text message or phone call to a family member or friend to report the possibility of a misplaced device. The method 100 can determine when the device has been misplaced/left by analyzing past location and time series data, and then alert one or more contacts or other devices normally near the person at that time.

In an embodiment, the method 100 reviews repeated data that shows that people identified by the owner as family/friends gather at the same location on specified dates. Then, at a future time, the method 100 may notice that the device location is different than a current normal location for the device. The method 100 can check that there has been no use of the device since the current normal location of the device changed. At this point, the method 100 may attempt to alert the user on the device itself. In an embodiment, If the device hasn't actually been left or lost, the user can respond without any notifications going out to anyone else. If the user does not respond to the on-device alert, the notification system then can notify a family/friend (pre-defined by the device owner) that the device may have been misplaced.

Alternately, the notification system can alert a second device owned by the same user such as a tablet, notebook or laptop computer, or vehicle mounted entertainment or navigation system.

In an embodiment, the method 100 may include an application on a smartphone being set up by its owner with permission to monitor device location, identify patterns, and attempt to detect when the device has been misplaced. Contacts from phone's contact list can be selected for notification, and special numbers can be entered for other people or automated systems which are not in the phone's contact list. The application can run continuously (autostart on phone reboot), monitor and record time and location data. In an embodiment, past time and location data can be retrieved from other location tracking services or applications. In an embodiment, with user permission, location data can also be sent to a centralized server for storage, aggregation, and analytics for association with other people.

In an embodiment, misplaced or "left behind" detection can be performed in one or more of the following ways: Analytics internal to the phone (or at a data collector/server) can determine the current time and location of the phone is inconsistent with prior patterns, and (optionally) that the phone is not moving according to its gyroscopic and/or GPS (Global Positioning System) sensors. Analytics performed at the server in conjunction with time and location data from other registered devices/contacts can indicate that the phone is not near other devices it is normally near at this time/location. In this case, a simple alert can be sent to the phone (the location of other devices used in the analytics may not be revealed to protect individual preference).

In an embodiment, when the method 100 detects the phone has been misplaced/left behind, the following steps can be performed: The method 100 may try an alert on the device itself. If the device hasn't actually been left, the user can respond on the device and others might not be notified. This can greatly decrease "nuisance alerts". The method 100 may only proceed if the user does not respond (optionally, behind a graphic, pin, face recognition, fingerprint, password, or other security mechanism). Alert the contacts the user is normally with at this time (family/friends). In addition, instead of alerting friends and family, in-car or in-home services may also be activated for alerting (such as OnStar, home security systems, and home phone lines may be called with an automated voice system). Alerts may consist of phone calls with automated voice, SMS (Short Message Service), email, or other signalling mechanisms. The current location of the device may optionally be reported as GPS coordinates or a business name or address by performing a reverse GPS coordinate lookup with a mapping system known in the art.

In an embodiment, as an example of the expected location being predicted as a function of location in relation to other devices that are located nearby or are known to be traveling with the first device, if there is a group of people going to lunch and all electronic devices leave the restaurant, except one phone does not, or if everyone gets out of a car with their smart phones, but one does not, or if everyone gets out of a taxi or plane or bus or train and one does not. This may also apply if a smartwatch travels with the person's smartphone and the smartwatch is left somewhere (like the locker in the gym) while the person takes the smartphone with them)

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers.

A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions by a computer to cause the device to:

determine that a first electronic device is not within its expected location, the expected location predicted based on previous movement patterns of the first electronic device captured via location data such as GPS and time associated with the previous movement patterns;

select contacts from a contact list on the first electronic device for notification of the contacts when the first electronic device is not within its expected location;

continuously monitor time and location data for the first electronic device; sending the time and location data of the first electronic device to a centralized server, wherein the location data of the first electronic device is reported as location coordinates;

issuing an alert that the first electronic device is lost, wherein the alert that the first electronic device is lost is based on determining that a current time and location of the first electronic device is inconsistent with prior patterns, and based on determining that the first electronic device is not moving according to its acceleration, gyroscopic and GPS sensors, and based on the electronic device following a set pattern, and based on analytics performed at the centralized server in conjunction with time and location data from other registered devices indicating that the first electronic device is not near other electronic devices it is normally near at this time or location, wherein the expected location is further predicted as a function of a distance between the first electronic device and a nearby second electronic device having the first electronic device's previous movement patterns and known to be traveling with the first electronic device,
wherein the alerting issues a first alert call to the first electronic device if there has been no use of the first electronic device since a current normal location of the first electronic device changed,
wherein the alerting issues a second alert call to the contacts on the contact list of whom first electronic device user is normally with at this time if there is no response from the first alert call,
wherein the alerting further includes issuing a third alert to the second electronic device that the first electronic device is lost,
wherein the expected location is predicted as a function of location in relation to other devices that are located nearby or are known to be traveling with the first electronic device,
wherein the first electronic device tracks it's distance to the second electronic device using electronic signal strength between the devices, and
wherein when the electronic signal strength is determined to go below a threshold, the first electronic device emits a notification and the second electronic device emits a notification.

* * * * *